Jan. 11, 1966  J. B. KUCERA  3,228,514
SILO UNLOADER

Filed April 10, 1964  5 Sheets-Sheet 1

INVENTOR
JOSEPH B. KUCERA
BY
Rudolph L. Lowell
ATTORNEY

Jan. 11, 1966   J. B. KUCERA   3,228,514
SILO UNLOADER

Filed April 10, 1964   5 Sheets-Sheet 2

INVENTOR
JOSEPH B. KUCERA
BY Rudolph L. Rowell
ATTORNEY

Jan. 11, 1966  J. B. KUCERA  3,228,514
SILO UNLOADER

Filed April 10, 1964  5 Sheets-Sheet 3

INVENTOR
JOSEPH B. KUCERA
BY
Rudolph L. Lowell
ATTORNEY

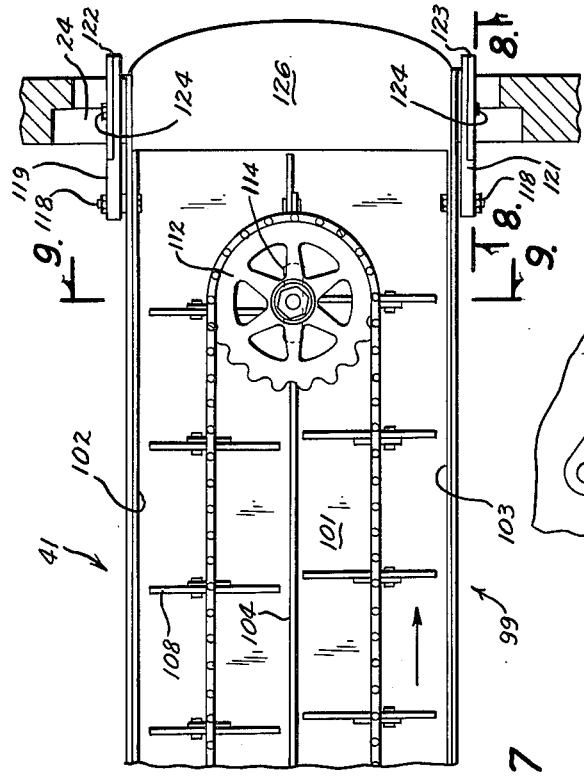

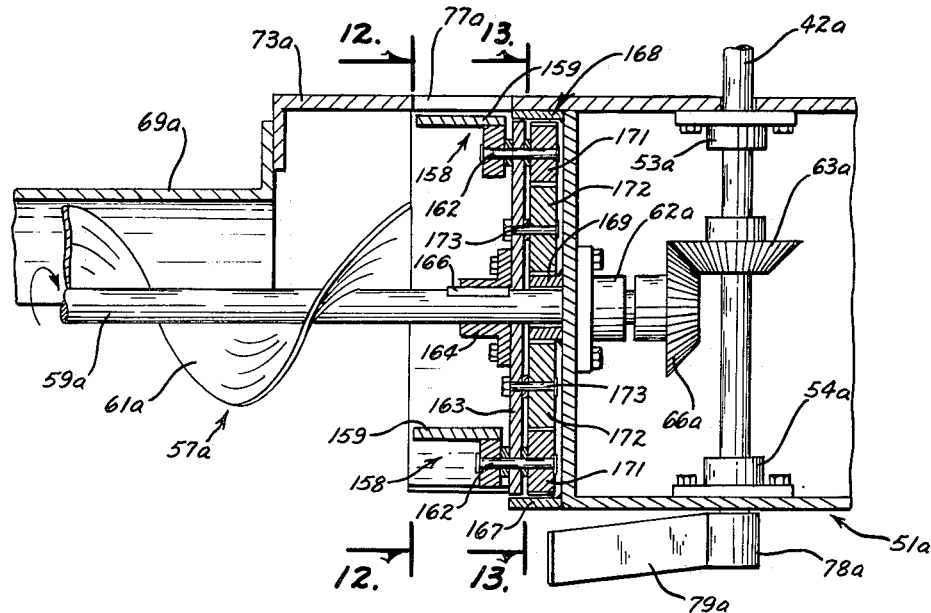
Fig. 11
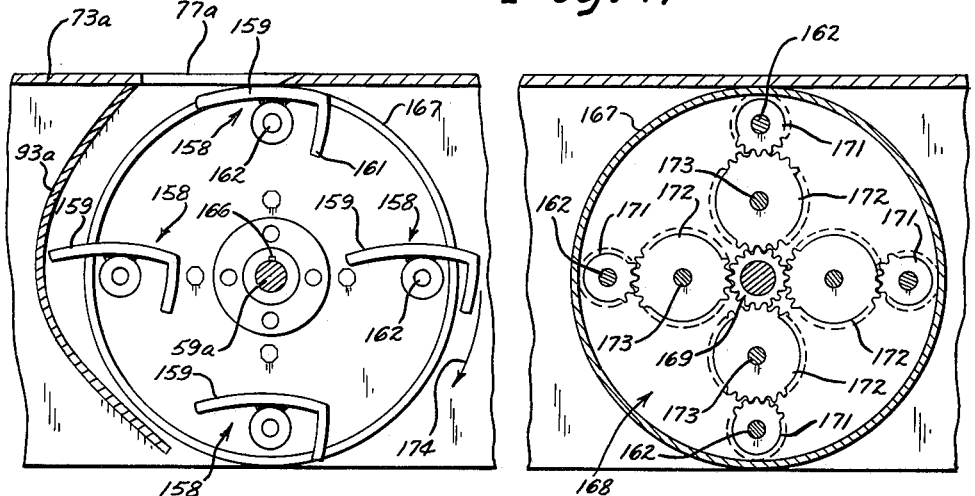
Fig. 12
Fig. 13

United States Patent Office 3,228,514
Patented Jan. 11, 1966

3,228,514
SILO UNLOADER
Joseph B. Kucera, Traer, Iowa, assignor of fifty percent to Rudolph L. Lowell, Des Moines, Iowa
Filed Apr. 10, 1964, Ser. No. 358,748
4 Claims. (Cl. 198—95)

This invention relates to a material gathering and conveying apparatus and more particularly to a silo unloader operable to remove bulk material stored in a silo.

It is the object of the invention to provide a silo unloader having at least one silage collector for moving silage toward the center area of a silo and a lateral conveyer for carrying the silage from the center area of the silo to a silage discharge chute with an improved elevator means for lifting the silage from the collector to the conveyer.

Another object of the invention is to provide an improved silo unloader having a silage collector which conjointly moves the silage toward the center area of the silo and walks around the silo, and a lateral conveyer which conveys silage from the center area of the silo to a silo discharge chute.

A further object of the invention is to provide a silo unloader which has low power requirements and is self-cleaning during operation.

A further object of the invention is to provide in combination with a silo unloader, a control means for raising or lowering the silo unloader in accordance with the level of the silage in the silo.

Still another object of the invention is to provide a silo unloader which can be quickly converted to assist in the loading of forage into a silo by evenly distributing the forage to all parts of the silo thereby assuring a uniform packing of silage.

Additional objects of the invention are to provide a reliable and economical silo unloader which is sturdy in construction and readily accessible for repair and servicing.

Other objects and advantages of the apparatus embodying the invention will be apparent from the following detailed description taken in conjunction with the drawings, in which:

FIG. 7 is an enlarged plan view of the lateral silage conveyer of the silo unloader of FIG. 1;

FIG. 8 is an enlarged sectional view taken along the line 8—8 of FIG. 7;

FIG. 9 is an enlarged sectional view taken along the line 9—9 of FIG. 7;

FIG. 11 is a sectional view similar to FIG. 3 showing a modified elevator means for lifting the silage from the auger collector to the lateral conveyer;

FIG. 12 is an enlarged sectional view taken along the line 12—12 of FIG. 11; and FIG. 13 is an enlarged sectional view taken along the line 13—13 of FIG. 11.

Figure 1:
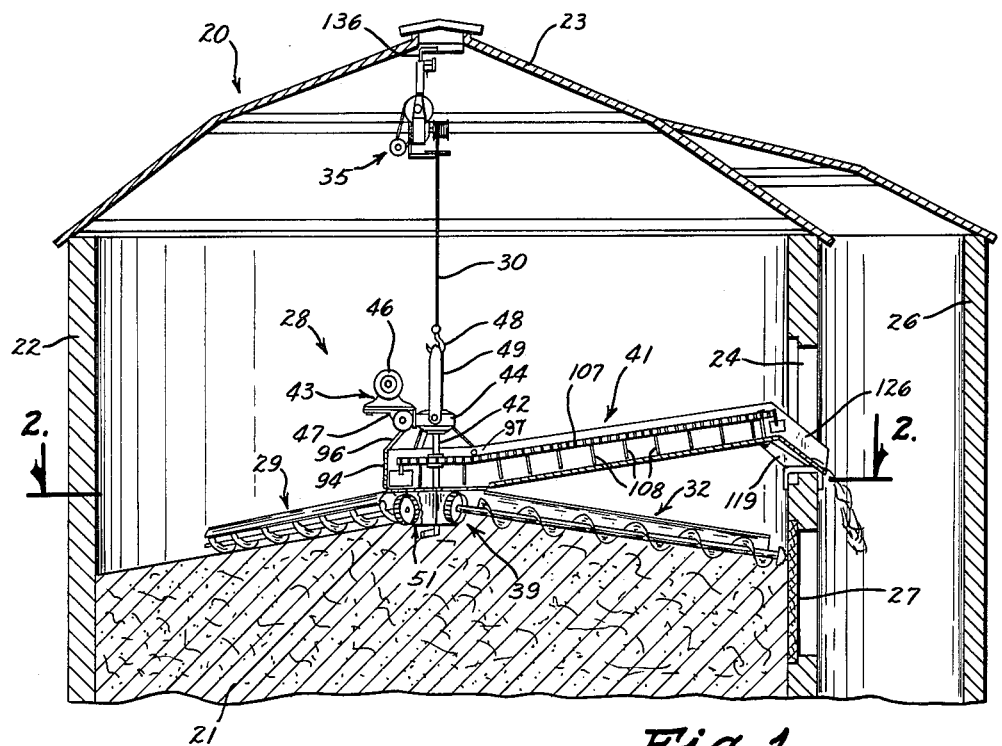
FIG. 1 is a vertical sectional view of a silo showing, in side elevation, the improved silage unloader of this invention in operative relation with the silage stored in the silo.

Referring to the drawing, there is shown in FIG. 1 an upright cylindrical silo 20 partially filled with silage 21 such as cut grasses or corn. The silo 20 is a conventional structure having a circular side wall 22 and a roof unit 23 supported on the top edge of the side wall 22. Vertically aligned openings or doorways 24 in the side wall 22 open into an upright silage discharge chute 26. In order to retain the silage 21 in the silo, removable doors 27 are positioned in the doorways 24. As the level of the silage is lowered the doors 27 are removed from the doorway above the surface of the silage thereby providing an access opening through which the silage may be discharged into the chute 26.

The silo unloader of this invention indicated generally at 28 is suspended from the roof unit 23 by a cable 30 and winch means 35 and is positioned on the top of the silage. In operation the silo unloader 28 collects and conveys the top layer of silage to the center area of the silo. From the center area of the silo the unloader 28 conveys the silage through the doorway 24 into the discharge chute 26.

Figure 2:
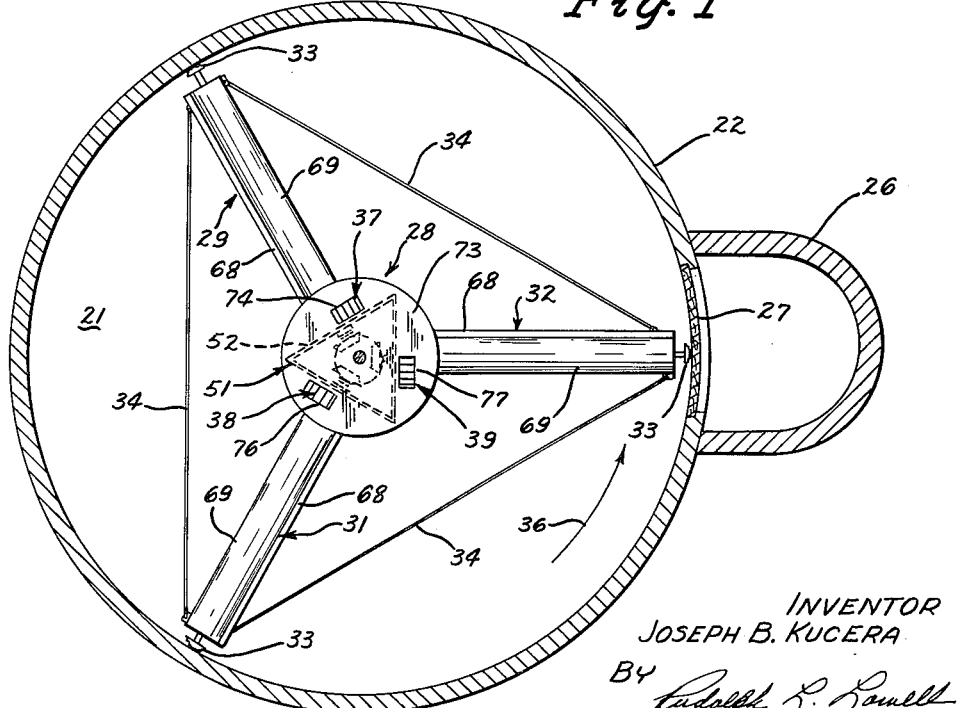
FIG. 2 is an enlarged sectional view taken along the line 2—2 of FIG. 1.

As shown in FIG. 2, the silo unloader 28 has three radially extended silage collector units 29, 31 and 32 which are equally spaced from each other and extend outwardly and downwardly from the center area of the silo to the side wall 22. Each collector unit has mounted on its outer end a chipper wheel 33 which cuts and loosens the silage adjacent the side wall 22. As shown in FIG. 1, in the level or operating position each silage collector unit 29, 31 and 32 is in engagement with the top surface of the stored silage 21 along its entire axial length. Since the collector units extend radially outwardly at a slight downward angle, the top surface of the silage 21 has a flat cone shape.

The bending forces on each of the collector units 29, 31 and 32 is minimized by a cable 34 connected to the outer ends of adjacent collector units. The cable 34 circumferentially connects the units.

The collector units 29, 31 and 32 move or walk around the silo in the direction of the arrow 36 shown in FIG. 2. During such walking movement the collector units act to move the top layer of silage toward the center area of the silo. Elevator mechanisms 37, 38 and 39 at the inner ends of the collector units 29, 31 and 32, respectively, receive silage from the discharge ends of the collector units and move the silage in an upward direction to a lateral conveyer 41 extended to a doorway 24 in the side wall 22. The lateral conveyor 41 carries the silage from the center area of the silo through the doorway 24 for discharge into the chute 26.

The silo unloader 28 has an upwardly extended main drive shaft 42. Mounted on the upper end of the drive shaft 42 in a driving relation therewith is a power transmission assembly 43, such as a worm and worm gear unit enclosed in a housing 44. The drive shaft 22 extends through and is rotatably mounted within the housing 44. The power transmission assembly 43 includes an electric motor 46 mounted on the housing 44 by an L-shaped table 47. The motor 26 drives the worm of the power transmission assembly 43. The electric motor 46 is connected to a power supply by manually operated switch (not shown) conveniently located at the base of the silo.

The lower end of the cable 30 is connected to a hook 48 positioned about an inverted U-shaped strap 49 connected at its ends to the housing 44. Thus, the silage unloader 28 is suspended from the roof unit 23 of the silo 20 by the cable 30 and the winch means 35.

Figure 3:
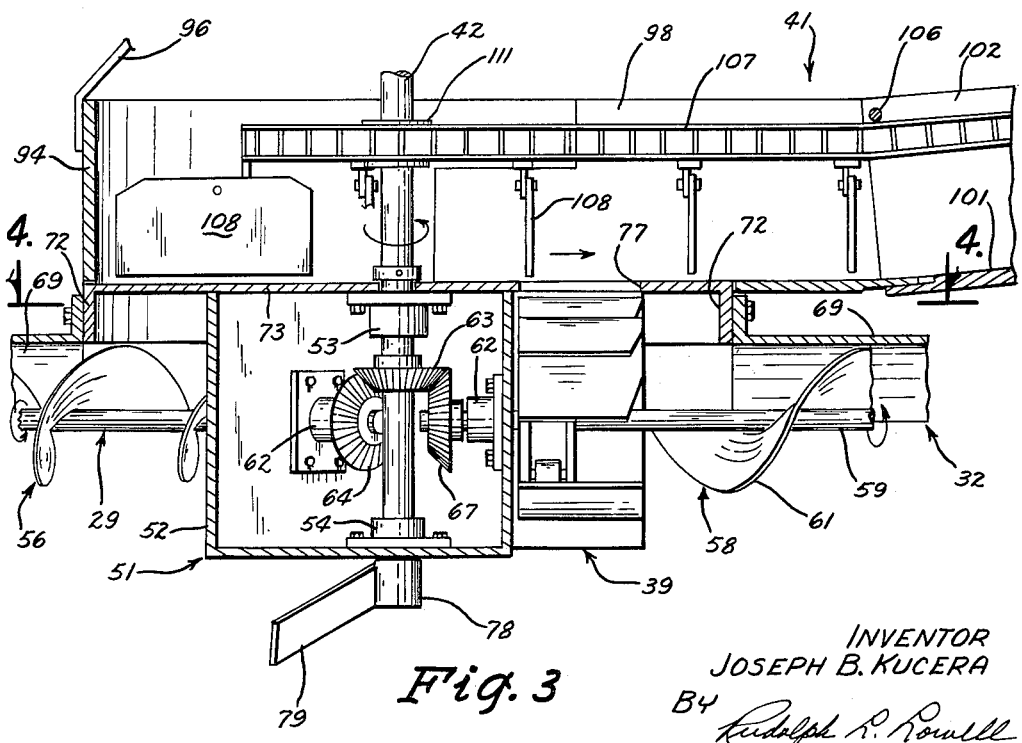
FIG. 3 is an enlarged vertical sectional view of the center section of the silo unloader of FIG. 1.

As shown in FIG. 3, the lower end of the drive shaft 42 extends through a drive unit 51 having a triangular-shaped housing 52. Bearings 53 and 54 rotatably mount the housing 52 on the shaft 42.

Figure 4:
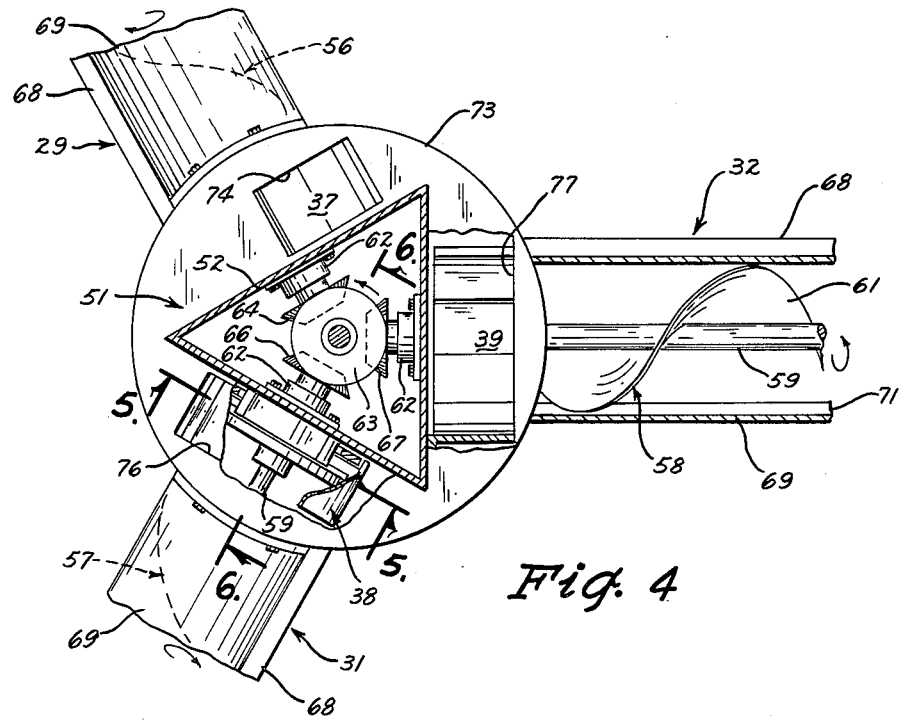
FIG. 4 is a sectional view taken along the line 4—4 of FIG. 3.

As shown in FIG. 4, the collector units 29, 31 and 32 have augers 56, 57 and 58, respectively, which are in engagement with the silage 21. Each auger has an axial shaft 59 carrying a continuous helical flight 61. The inner ends of the shafts 59 for the augers 56, 57, and 58 extend into the housing 52 and are rotatably mounted by bearings 62 mounted on the inside wall of the housing 52.

A bevel drive gear 63 is secured to the portion of the upright drive shaft 42 in the housing 52. The gear 59 engages driven bevel gears 64, 66 and 67 secured to the inner ends of the shaft 59 of the augers 56, 57 and 58. The drive shaft 42 rotates the bevel gear 63 which is in engagement with the top sectors of the gears 64, 66 and 67, thereby rotating the gears 64, 66 and 67 and the shaft 59 of the augers 56, 57 and 58 in the direction of movement of the collector units around the silo. In addition to rotating the augers of the collector units, the bevel drive gear 63 coacts with the driven bevel gears 64, 66 and 67 to produce a torque which rotates the housing 52 in the direction of the arrow 36 to move or walk the collector units 29, 31 and 32 around the silo wall 22.

As shown in FIGS. 2 and 4, each collector unit 29, 31 and 32 has a radially projected angle beam 68 adjacent the forward section of the helical flight 61. The inner ends of the angle beams 68 are secured to the housing 52. The angle beams 68 extend substantially parallel to a corresponding auger shaft 59 and lie substantially in a longitudinal plane of the shafts 59. The outer ends of the angle beams 68 terminate adjacent the chipper wheels 33. Arcuate covers or sheaths 69 are secured to the angle beams 68 and extend over the top and back section of the auger flights 61. Each cover 69 terminates in a longitudinally projected edge 71 adjacent the rear portion of the bottom section of the auger flights 61.

The inner end of each cover 69 is secured to an upright cylindrical rim 72 attached to the top wall 73 of the housing 52. The rim 72 has a diameter larger than the outside dimensions of the housing 52 so as to provide a throat area for the elevator mechanisms 37, 38 and 39. As shown in FIG. 2, the top wall 73 has three openings 74, 76 and 77 in alignment with the elevator mechanisms 37, 38 and 39, respectively, so that the silage conveyed by the rotating auger flights 61 is moved into the throat area and transported upwardly by the elevator mechanisms 37, 38 and 39 through the openings 74, 76 and 77 onto the top of the wall 73.

Figures 5, 6, 10:
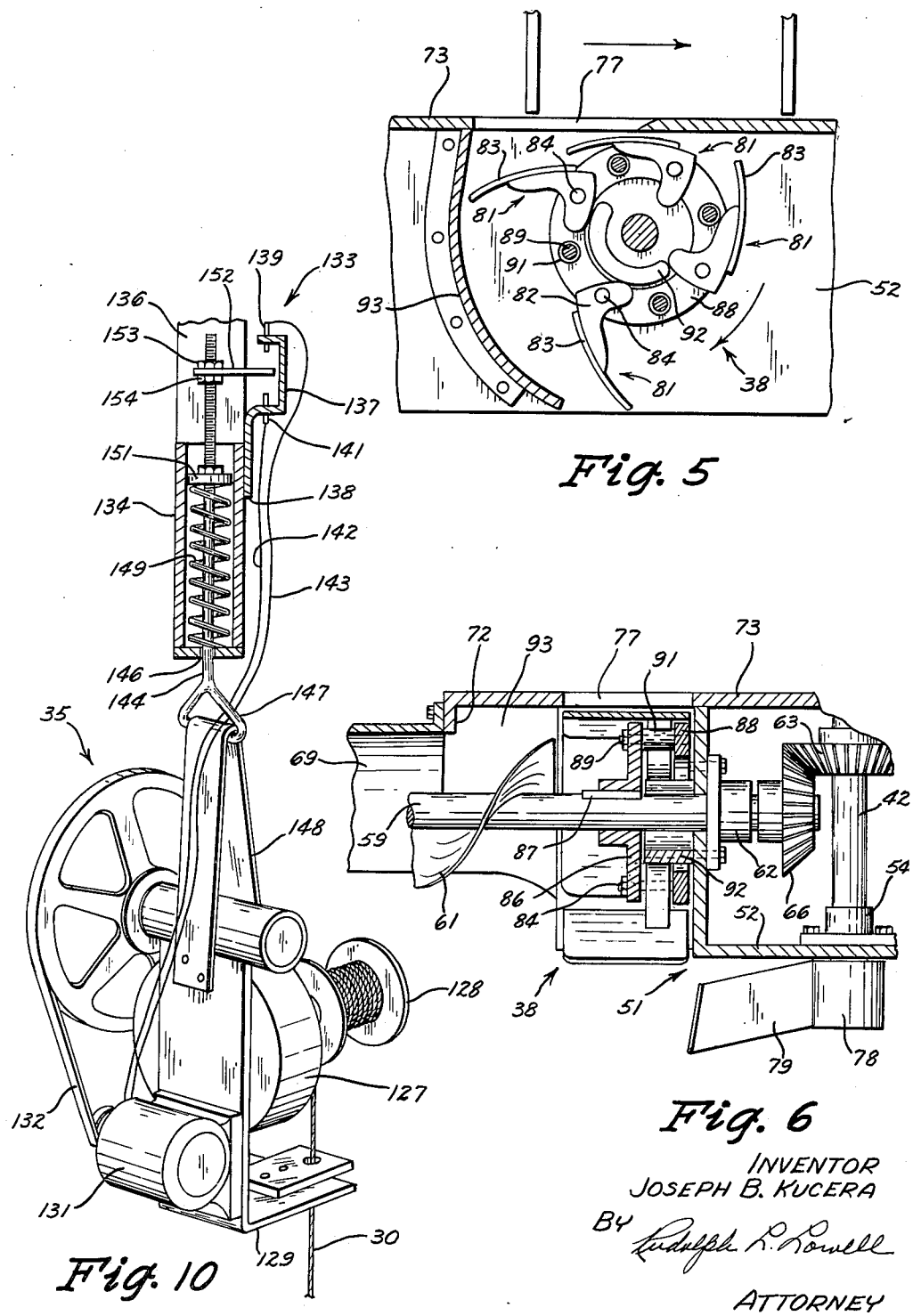
FIG. 5 is an enlarged sectional view taken along the line 5—5 of FIG. 4.
FIG. 6 is an enlarged sectional view taken along the line 6—6 of FIG. 4.
FIG. 10 is an enlarged perspective view of the automatic positioning device for the silo unloader of FIG. 1.

As shown in FIGS. 3 and 6, the lower end of the upright drive shaft 42, projects through the housing 52 and carries a collar 78 having an outwardly extended arm 79. Rotation of the shaft 42 moves the arm 79 in a circular path forcing the silage immediately under the housing 52 in an outward direction into the working area of the elevator mechanisms 37, 38 and 39.

The elevator mechanisms 37, 38 and 39 are identical in construction and operate in response to rotation of the auger shaft 59 to transport silage collected by the augers and moved by the arm 79 in an upward direction into the lateral conveyor 41. The following detailed description is limited to the elevator mechanism 38 shown in FIGS. 5 and 6.

The elevator mechanism 38 comprises a plurality of elevating platforms 81 which move in a circuitous path concentrically about the shaft 59. As shown in FIG. 5, each platform 81 comprises a bell crank 82 and a convex curved hand 83 secured to the top of the outwardly directed arm of the bell crank. A pin 84 extends through the apex portion of the bell crank to pivotally mount the elevating platform 81 to a disc 86 attached to the shaft 59. As shown in FIG. 6, the disc 86 is secured to shaft 59 by a key 87.

In order to reduce the bending forces on the pins 84 the inner ends of the pins are carried in a flat ring 88 positioned between the disc 86 and the housing 52. The ring 88 is attached to the disc 86 by nut and bolt assemblies 89. The space relationship between the disc 86 and the ring 88 is maintained by cylindrical spacers 91 positioned about the bolts of the nut and bolt assemblies 89.

The angular positions of the elevating platforms 81 during the movement in the circuitous path controlled by an arcuate cam 92 is secured to the housing 52. As shown in FIG. 5, the cam 92 has an arcuate length of about 180° and is positioned adjacent the lower and trailing sections of the auger shaft 59. The inwardly directed arm of the bell crank 82 engages the outer surface of the cam 92 and functions as a cam follower to control the angular position of the elevating platform 81. When the bell crank 82 is in engagement with the cam 92 the hand 83 is gradually moved to a radial direction during upward movement thereof toward the opening 77 in the top wall 73. The silage carried by the hand is forced through the opening 77 onto the top wall 73. As the hand 83 approaches the top wall 73 the bell crank 82 moves from the cam 92 whereby the hand 83 folds between the periphery of the disc 86 and the top wall 73.

The silage is retained on the hands 83 by a curved guide member 93 which extends about the trailing sector of the elevator mechanism 38. The guide member 93 is an extension of the rear portion of the cover 69 as shown in FIG. 6.

Referring to FIG. 1, the lateral conveyer 41 comprises a housing 94 projected in an upward direction and connected to the housing 44 of the power transmission assembly 43 by a plurality of arms 96. The lower edge of the housing 94 is positioned in a contiguous relation with the peripheral portion of the top wall 73 so as to retain the silage thereon. One side of the housing 94 has a lateral spout 97 projected toward the doorway 24. As shown in FIG. 7, the spout 97 is divided by an upright plate 98 extended into a contiguous relationship with the shaft 42.

A pan 99 having a base wall 101 and upright side walls 102 and 103 projects from the spout 97 to the doorway 24. A longitudinally extended rib 104 secured to the midsection of the base wall 101 divides the pan 99 into longitudinal channels. As shown in FIG. 6, the side walls 102 and 103 of the pan positioned adjacent the upright walls of the spout 97 and the rib 104 overlaps the upright plate 98. A transverse pin 106 projects through the overlapped portions of the pan and side walls and pivotally mounts the pan on the housing spout 97.

The silage moved onto the top wall 73 is carried along the base wall 101 of the pan by an endless chain 107 having longitudinally spaced paddles 108 extended transversely of the chain and downwardly into the pan 99. Each paddle is attached to a selected link in the chain 107 by a nut and bolt assembly 109.

Chain 107 is trained about a sprocket 111 mounted on the upright shaft 42 above the base wall 73. As shown in FIG. 6, the top side of the chain 107 engages the pin 106 so as to maintain the chain in alignment with the sprocket 111. The opposite end of the chain 107 is trained about an idler sprocket 112 rotatably mounted in a horizontal position on the base wall 101 by a nut and bolt assembly 113 (FIG. 9). The nut and bolt assembly 113 is positioned in a longitudinal adjustment of the idler sprocket 111 so as to vary the length and tension on the chain 107.

As shown in FIG. 9, pan 99 is reinforced by a pair of angle beams 116 and 117 positioned longitudinally of the pan 99 secured to the side walls 102 and 103 and the base wall 101. Pivotally mounted on the outer ends of the angle beams 116 and 117 by nut and bolt assemblies 118 are a pair of arms 119 and 121 extended to the doorway 24. U-shaped clamps 122 and 123 are pivotally mounted to the end of each of the arms 119 and 121 by nut and bolt assemblies 124. As shown in FIG. 8, the U-shaped clamp 123 engages the opposite sides of the sill section of the silo wall 22 so as to maintain the lateral conveyer 41 in alignment with the doorway 24. Pivotally mounted on the end of the pan 99 is a U-shaped slide 126 extended downwardly and outwardly from the end of the pan base wall 101. The slide 126 functions as a guide to direct the silage pushed from the end of the pan 99 into the silo chute 26.

The winch means 35 shown in FIG. 10 comprises a worm drive unit 127 having a drum 128 for receiving the suspension cable 30. An angular plate 129 supports a reversible electric motor 131 and the worm drive unit 127. The electric motor 131 is coupled in a driving relation with the worm drive unit 127 by a belt 132. A control switch indicated generally at 133 is operable to connect the electric motor 131 and a source of electric power. The switch 133 is operative in response to the load on the cable 30 to run the motor 131 in opposite directions.

The control switch 133 comprises a cup-shaped housing 134 connected to the roof unit of the silo by an angle strap 136 as shown in FIG. 1. A U-shaped bracket 137 having a downwardly extended leg 138 is secured to one side of the housing 134. Each side of the U-shaped bracket 137 carries an insulated electrical contact 139 and 141, respectively. Lines 142 and 143 connect the contacts 139 and 141 to the reversible electric motor 131.

A rod 144 projects through a hole 146 in the bottom wall of the housing 134 and extends out of the housing above the top thereof. The lower end of the rod 144 is shaped into a loop 147 to accommodate a strap 148 secured at its ends to the angle plate 129 and the worm drive unit 127.

A coil spring 149 is positioned within the housing 134 concentrically of the rod 144. A nut 151 threadably secured to the rod 144 engages the top of the spring 149 thereby connecting the rod 144 through the spring 149 to the housing 134. A laterally projected conductor element 152 is held on the upper threaded end of the rod 144 between a pair of nuts 153 and 154. The element 152 is connected to a source of electric power (not shown). The end of the conductor element 152 is positioned between the insulated contacts 139 and 141. The position of the conductor element 152 with respect to the electrical contacts 139 and 141 may be adjusted by changing the vertical position of the nuts 153 and 154.

When the conductor element 152 engages the electrical contact 139 the electric motor 131 is connected to a source of electric power thereby operating the worm drive unit 127 which in turn rotates the drum 128 to decrease the length of the suspension cable 30. When the weight on the cable 30 has been increased the spring 149 will be compressed thereby moving the conductor element 152 out of engagement with the electrical contact 139 breaking the electric circuit to the motor 131.

In operation, the silo unloader 28 is suspended in the silo 20 by the cable 30 and winch means 35. The lateral conveyer 41 is in alignment with the doorway 24 with the arms 119 and 121 and their associated clamps 122 and 123 coupled to the sill of the doorway.

When the electric motor 46 is connected to a source of electric power the power transmission assembly 43 rotates the upright drive shaft 42 in the direction of the arrow 36 as shown in FIG. 2. The turning drive shaft 42 rotates the augers 56, 57 and 58 of the collector units 29, 31 and 32. The rotating augers collect and convey the top layer of silage toward the center area of the silo. The meshing bevel gears 63, 64, 66 and 67 in the drive unit 51 transmit torque to the drive shaft 59 of the augers and provide a torque on the housing 52 causing the collector units 29, 31 and 32 to move or walk around the silo 20. The speed of the walking movement of the collector units depends upon the amount of silage being conveyed by the respective augers toward the center of the silo and the frictional drag of the chipper wheel 33 on the silo side wall 22. The greater the quantity of material moved by the augers the slower the circumferential movement of the collector units around the silo. When the augers are raised out of engagement with the surface of the silage they will move around the silo at substantially the same rate of speed of rotation as the upright drive shaft 42.

The silage moved toward the center area of the silo by the augers of the collector units 29, 31 and 32 is moved by the elevator mechanisms 37, 38 and 39 in an upward direction through the openings 74, 76 and 77 in the top wall 73 into the path of movement of the paddles 108 of the lateral conveyer 141. The moving paddles 108 slide the silage along the conveyer pan 99 and discharge it through the open doorway 24 into the silo chute 26. The hands 83 on the elevating platform 81 carry the silage in an upward direction along the guide member 93. As the hands 83 fold under the top wall 73 the silage carried thereby is scraped from the top of the hand and forced by the silage on the next proceeding hand through the opening 77 in the top wall 73 as shown in FIG. 5. This action is successively repeated during the rotation of the elevator mechanism.

As the silage is removed from the silo 20 the winch means 35 is automatically operated by the control switch 133 to lower the silo unloader 28 thereby keeping the collector units 29, 31 and 32 in constant and uniform engagement with the top of the silage. This position is regulated by the compression characteristics of the spring 149 in the control switch 133.

When the weight on the cable 30 is increased by the removal of the silage support from under the silo unloader 28, the spring 149 will be compressed thereby moving the lateral conductor element 152 into engagement with the electrical contact 141. The reversible electrical motor 131 is thereby connected to the source of electric power and operated to turn the worm drive unit 127 and increase the length of the cable 30 with the resultant lowering of the silo unloader 28. When the silo unloader rests on top of the silage 21 in the silo the weight on the cable 30 is decreased so that the spring 149 biases the conductor element 152 upwards out of engagement with the electrical contact 141 and breaking the electric circuit to the motor 131. This on and off operation of the winch means 35 is continuous to automatically unload the silo unloader 28 with the lowering of the level of the silage in the silo. As the level of silage is lowered the livestock rancher periodically removes the doors 27 and lowers the outer end of the lateral conveyer 41.

This silo unloading system can be used to evenly distribute the cut forage during the filling of the silo 20. In the loading or filling of the silo, the silo unloader 28 is suspended from the roof unit 23 by the cable 30 and the winch means 35. The lateral conveyer 41 is removed. The control switch 133 is adjusted so that the collecting augers 56, 57 and 58 of the collector units engage only a relatively thin top layer of silage so that they move or walk around the silo at a rate of speed just under the speed of rotation of the upright drive shaft 42. The respective augers 56, 57 and 58 rotate about their axes by the torque established by the coacting bevel gears in the drive unit 51. The turning augers move the silage toward the center of the silo. This movement is counteracted by the outward centrifugal action of the augers as they move around the silo. This centrifugal action tends to throw the silage toward the peripheral walls of the silo.

The position of the silo unloader 28 is automatically maintained by the winch means 35 as shown in FIG. 10. When the silo unloader 28 is used to level material placed in the silo the conductor element 152 is adjusted upward on the rod 144 so that when part of the weight of the silo unloader has been removed from the cable 30 the coil spring 149 will bias the conductor element 152 into engagement with the upper electrical contact 139. This connection will connect the motor 131 with the source of electric power with the result that the motor will operate the worm drive unit 127 in a direction to wind the cable 30 on the drum 128. With the shortening of the cable 30 the silo unloader 28 will be lifted from the surface of the silo. The increased load on the cable 30 will compress the spring 149 thereby moving the conductor element 152 from the electric contact 139 breaking the electric circuit to the motor 131.

A modified elevator mechanism indicated generally at 156 is shown in FIGS. 11, 12 and 13. The elevator mechanism 156 is in combination with a silo unloader 157 similar in construction to the silo unloader 28 with corresponding structure identified with the suffix a. The elevator mechanism 156 comprises a plurality of elevating platforms 158 which move in a circular path about the auger shaft 59a. The elevating platforms 158 have a convex horizontal hand 159 and a downwardly extended finger 161 at the trailing edge thereof. Each elevating platform 158 is secured at its midsection to a shaft 162 journaled in an upright plate 163 attached to the auger drive shaft 59a by a collar 164 and key 166. As shown in FIG. 11, the peripheral edge of the plate 163 is adjacent a cylindrical ring 167 secured to the housing 52a. The plate 163 in the cylindrical ring 167 along with the side wall of the housing 52a form a casing for a gear train indicated generally at 168 which operates to retain the hand 159 of the elevating platforms in a substantially horizontal position during movement thereof in a circumferential path about the axes of the augers. The gear train 168 comprises a stationary sun gear 169 secured to the housing side wall 52a concentrically about the auger shaft 59a. A control gear 171 is mounted on each of the shafts 162. The gears 171 each have a diameter which is substantially identical to the diameter and has the same number of teeth of the sun gear 169.

Idler gears 172 rotatably mounted on studs 173 carried by the plate 163 drivably connect the sun gear with the gears 171.

In use, on rotation of the auger 57a the elevating platforms 58 move in the direction of the arrow 174 as shown in FIG. 12. As the platforms 158 move in a circular path about the axis of the sun gear 169 the control gears 171 are rotated through the idler gears 172 to maintain the hands 159 in a substantially horizontal position as they move around with the auger 57a. The downwardly directed fingers 161 dig into the silage and direct silage into the lower section of the guide member 93a. The next hand 59 carries the silage fed by the auger flight 61a and the silage dug by the preceding finger 161 in an upward direction through the opening 77a in the top wall 73a. The concave top surface of the hand 159 moves under the top wall 73a forcing the silage through the opening 77a.

In summary, the silo unloader 28 has a plurality of radially extended collector units 29, 31 and 32 which function to conjointly move silage toward the center area of the silo and walk around the silo. The silage at the center area of the silo is positively moved in an upward direction by elevator mechanisms 37, 38 and 39 which operate in response to rotation of the augers of the collector units to move the silage in an upward direction into a lateral conveyer 41 which transfers the silage to the silo chute 26.

The silo unloader 28 operates in combination with winch means 35 operable to control the vertical position of the unloader in response to the weight or force applied to the winch means. The resultant effect of this operation is an automatic movement of the collector units 29, 31 and 32 into engagement with the top of the silage 21 stored in the silo as the level of the silage is lowered.

While there have been shown, described, and pointed out the fundamental novel features of the invention, it is to be understood that various omissions, substitutions, changes in form and details of the apparatus illustrated may be made by those skilled in the art without departing from the spirit of the invention which is intended to be limited only as indicated by the scope of the following claims.

I claim:
1. In a bulk material handling apparatus:
 (a) an upright drive shaft,
 (b) auger means extended laterally of said drive shaft,
 (c) a drive unit connecting the auger means with the drive shaft whereby upon rotation of said drive shaft the auger means rotates about the longitudinal axis thereof and revolves about the axis of the drive shaft,
 (d) elevator means drivably connected to the auger means adjacent the drive unit for receiving material from said auger means, said elevator means having a plurality of spaced material elevating platforms pivotally connected thereto, said elevating platforms movable in a circuitous path to pick up and continuously carry bulk material from said auger means in an upward direction to a position above said auger means, and
 (e) conveyor means operatively associated with said drive shaft for receiving and conveying said upwardly moved material laterally therefrom.

2. In a bulk material handling apparatus as defined in claim 1, including:
 (a) coacting means on said drive unit and said elevating platforms to maintain the elevating platforms in a substantially horizontal position during the upward movement thereof.

3. In a bulk material handling apparatus:
 (a) an upright drive shaft,
 (b) auger means extended laterally of said drive shaft,
 (c) a drive unit connecting the auger means with the drive shaft whereby upon rotation of said drive shaft the auger means rotates about the longitudinal axis thereof and revolves about the axis of the drive shaft,
 (d) elevator means drivably connected to the auger means adjacent the drive unit for receiving material from said auger means, said elevator means having a plurality of spaced material elevating platforms movable in a circuitous path to transport bulk material in an upward direction,
 (e) conveyer means operatively associated with said drive shaft for receiving and conveying said upwardly moved material laterally therefrom,
 (f) disc means pivotally carrying the platforms, said disc means being drivably connected to the auger means, and
 (g) cam means secured to the drive unit and engageable with the elevating platforms to maintain the elevating platforms in a substantially horizontal position during the upward movement thereof.

4. In a bulk material handling apparatus:
 (a) an upright drive shaft,
 (b) auger means extended laterally of said drive shaft,
 (c) a drive unit connecting the auger means with the drive shaft whereby upon rotation of said drive shaft the auger means rotates about the longitudinal axis thereof and revolves about the axis of the drive shaft,
 (d) elevator means drivably connected to the auger means adjacent the drive unit for receiving material from said auger means, said elevator means having a plurality of spaced material elevating platforms movable in a circuitous path to transport bulk material in an upward direction,
 (e) conveyer means operatively associated with said drive shaft for receiving and conveying said upwardly moved material laterally therefrom,
 (f) disc means pivotally carrying the platforms, said disc means being drivably connected to the auger means, and
 (g) gear train means connected to the elevating platforms, disc means and drive unit and operable to maintain the elevating platforms in a substantially horizontal position during the movement thereof in said circuitous path.

References Cited by the Examiner

UNITED STATES PATENTS 2,794,560  6/1957  Buschbom.
3,146,899  9/1964  Bruecker.

GERALD M. FORLENZA, *Primary Examiner.*

HUGO O. SCHULZ, *Examiner.*